United States Patent [19]

Christie et al.

[11] Patent Number: 4,500,487
[45] Date of Patent: Feb. 19, 1985

[54] PRESSURE SURGE ATTENUATOR

[75] Inventors: Alan M. Christie, Swissvale; Kurt I. Snyder, Murrysville, both of Pa.

[73] Assignee: The United States of America as represented by the United States Department of Energy, Washington, D.C.

[21] Appl. No.: 352,603

[22] Filed: Feb. 26, 1982

[51] Int. Cl.³ .................. G21C 9/00; F16L 9/04; F16L 9/18
[52] U.S. Cl. .................. 376/283; 376/291; 376/286; 138/149
[58] Field of Search .............. 376/283, 285, 291, 292, 376/289, 290, 293, 294, 286; 188/377, 376; 138/149

[56] References Cited

U.S. PATENT DOCUMENTS

| | | |
|---|---|---|
| 2,553,016 | 12/1948 | Sosnick . |
| 3,016,462 | 1/1962 | Hendricksen et al. . |
| 3,186,913 | 1/1965 | Weisner et al. ............ 376/292 X |
| 3,320,969 | 5/1967 | Gordon . |
| 3,349,524 | 10/1967 | Fistedis . |
| 3,489,206 | 1/1970 | Lecourt . |
| 3,834,881 | 9/1974 | Niebylski . |
| 3,930,943 | 1/1976 | Michel et al. . |
| 3,933,182 | 1/1976 | Costes . |
| 3,974,027 | 8/1976 | Michel . |
| 3,979,866 | 9/1976 | Prescott . |
| 3,998,295 | 4/1976 | Lemont et al. . |
| 4,038,134 | 7/1977 | Dorner et al. . |
| 4,053,357 | 10/1977 | Pradhan et al. . |
| 4,055,464 | 10/1977 | Lemercier . |
| 4,055,465 | 10/1977 | Lemercier . |
| 4,092,215 | 5/1978 | Mutzl . |
| 4,099,961 | 7/1978 | Patten . |
| 4,167,968 | 9/1979 | Wietelmann ............ 376/283 X |
| 4,173,512 | 11/1979 | Meier et al. ............ 376/277 |
| 4,174,014 | 11/1979 | Bjorksten ............ 180/68.5 |

Primary Examiner—Richard E. Schafer
Assistant Examiner—Daniel Wasil

[57] ABSTRACT

A pressure surge attenuation system for pipes having a fluted region opposite crushable metal foam. As adapted for nuclear reactor vessels and heads, crushable metal foam is disposed to attenuate pressure surges.

4 Claims, 4 Drawing Figures

PRESSURE SURGE ATTENUATOR

GOVERNMENT CONTRACT

This invention was conceived during performance of a contract with the United States Government designated DE-AM02-76CH94000.

BACKGROUND OF THE INVENTION

This invention relates to a system for suppressing and absorbing pressure surges in piping and other systems, especially piping and systems part of liquid metal nuclear reactors.

Nuclear reactors often contain a large volume of liquid which is used to cool the reactor fuel. This liquid may be water, molten salt, or liquid metal, particularly liquid sodium. Because various reactor accidents may result in pressure surges in this liquid coolant, it is desired to provide a passive, reliable system for the suppression of such surges. It is desired to accomplish such suppression without loss of the integrity of the coolant-containing boundary such that no coolant is permitted to escape or spill.

SUMMARY OF THE INVENTION

Sections of piping are provided with fluted, thin walls surrounded by foam metal. Upon a coolant pressure surge, the fluted wall deforms by expansion, crushing the foam metal which absorbs the energy of deformation thereby attenuating the original pressure surge. Pressure surges may also be attenuated by installation of metal foam below the head of a nuclear reactor and surrounding a reactor vessel itself.

DETAILED DESCRIPTION

Various reactor accidents can cause pressure surges in the reactor coolant. When the reactor coolant is a material such as liquid sodium it is desired to attenuate the pressure surge without violation of the normal coolant boundary to prevent chemical interactions such as sodium burning. Conventional systems, using blow-out diaphragms, are therefore not optimum.

FIRST EMBODIMENT

Figure 1:
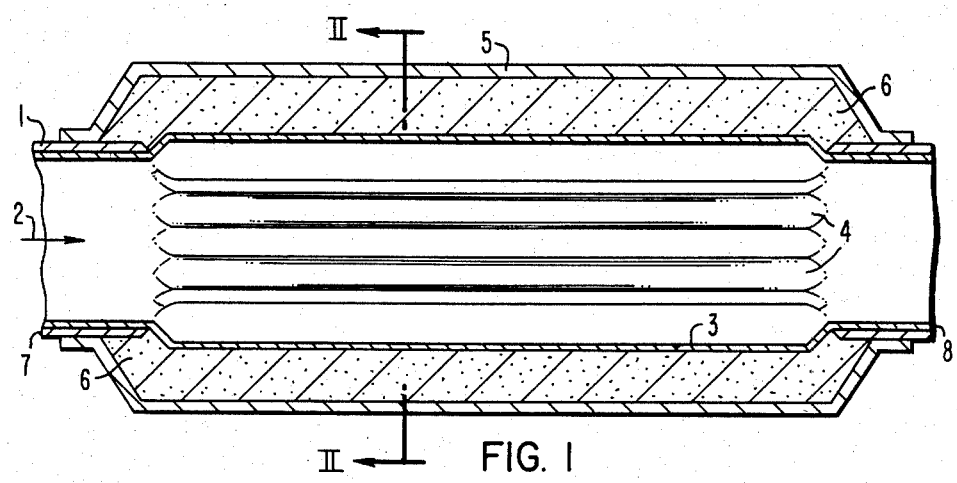
FIG. 1 is a schematic section of a pipe having the pressure surge suppression system of the invention.

The first embodiment of this invention is applicable to liquid filled pipes, especially coolant filled pipes of nuclear reactor systems. Refer to FIG. 1. A pipe 1 containing coolant 2 has a section of its length being of reduced thickness as compared to the pipe wall thickness, this section 3 moreover optionally having convolutions called flutes 4, visible in FIG. 2, herein. Fluted section 3 is surrounded by a container 5, with the space between container 5 and fluted section 3 being filled with crushable metal foam 6, which is shaped appropriately to fit within the flutes.

Metal foam is a material that exhibits controlled energy absorption properties which can be tailored to meet specific requirements. A variety of characteristics of the foam, such as metal alloy composition or void size, may be altered to change the specific energy absorption which occurs during crushing of the foam. Metal foam can be machined to fit desired geometric configurations such as the fluted section 3 of this embodiment.

Metal foam is available commercially from several sources, three being (1) Energy Research and Generation, Inc., of Oakland, Calif., (2) Foametal Division of Hogen Industries Inc. of Willoughby, Ohio and (3) Astro Met Associates Inc., of Cincinatti, Ohio.

Metal foam is described in detail by the following United States patents which are incorporated herein by reference: U.S. Pat. No. 4,099,961 to Patten, U.S. Pat. No. 3,834,881 to Niebylski, and U.S. Pat. No. 2,553,016 to Sosnick.

The operation of the first embodiment during a pressure surge will now be described. The pressure surge in coolant 2 in FIG. 1 is presumed to arrive as a pressure wave at end 7 of pipe 1, moving toward end 8. The surge is moreover presumed to be of such magnitude as to be hazardous to critical structures such that the fluted section 3 strength has been planned to allow the following response to the wave. Fluted section 3 expands radially outward from the center of pipe 1, the effect of the flutes being to allow such expansion without rupture. During expansion of fluted section 3, metal foam 6 is crushed, thereby absorbing energy and attenuating the pressure surge. The length L of the fluted section 3 must be sufficient that the pressure wave is reduced in intensity to a safe level prior to passing beyond section 3. The overall design of the system is planned to fully attenuate expected (or maximum possible) pressure surges prior to expansion of the fluted section to the point where further expansion must occur with plastic deformation of the flute material with consequent risk of rupture and coolant spillage.

Metal foam 6 may also serve as a radiation shield and thermal insulator.

Since the foam 6 is crushed during attenuation of a pressure surge, and the fluted section is deformed, the unit must be replaced when the fluted section is just fully expanded, or earlier. It is not presently envisioned that resilient or recoverable flutes and foam will be available.

Figure 2:
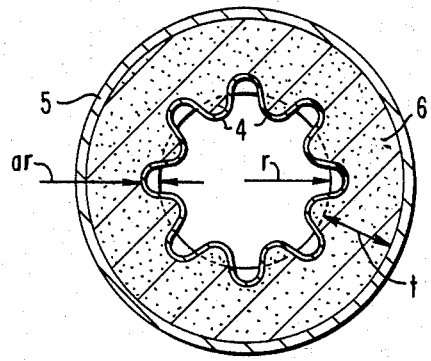
FIG. 2 is a plan section from FIG. 1.

An estimate of the potential energy absorbing capability of the first embodiment will now be given, with reference to FIGS. 1 and 2. For a pipe of radius r with N flutes of flute length L, and crushable foam thickness t, it can be shown that:

$$E = \frac{a^2 N^2 \pi r \sigma \epsilon [2r + t]}{4}$$

where:

E is the energy absorption per unit length L to completely expand the flute;

$\sigma$ is the yield stress of the foam; and $\epsilon$ is the final yield strain of the foam; and, a is the ratio of the maximum to average radius r of the fluted pipe.

Table I presents a calculated energy absorption for the indicated data.

TABLE I

| $\sigma$ | 500 PSI |
| --- | --- |

TABLE I-continued

| | |
|---|---|
| $\epsilon$ | 75% |
| r | 18 inches |
| t | 9.27 inches |
| N | 8 flutes |
| a | 0.155 |
| E | $3.69 \times 10^5$ in-lbs/in for a just fully expanded flute |

SECOND EMBODIMENT

Figure 3:
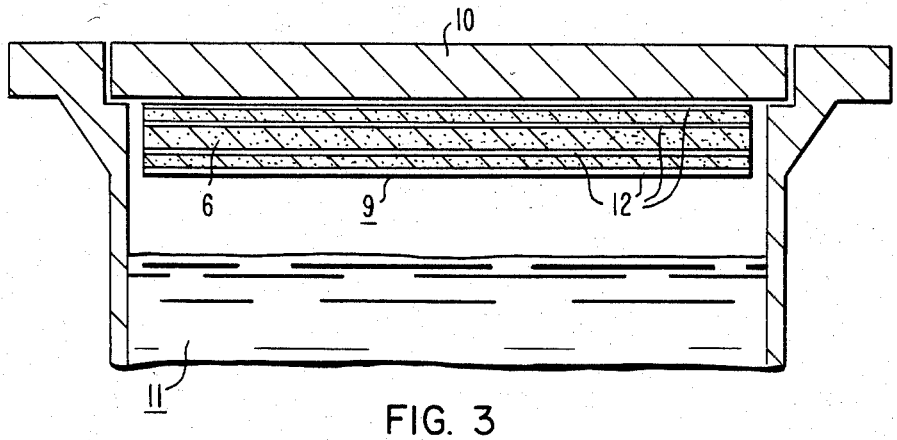
FIG. 3 is a schematic section of a reactor head region having the pressure surge suppression system of the invention.

Refer to FIG. 3. A pad 9 of crushable metal foam 6 is disposed beneath the head structure 10 of a reactor. As a result of a hypothetical accident in a reactor, impact of coolant pool 11 with head structure 10 may occur. Pad 9 will be crushed between plates 12, absorbing energy and attenuating the pressure surge.

Foam 6 serves also as a radiation and thermal shield. For crushable foam under-head shielding, potential energy absorption can be defined through $$E = \sigma_y \epsilon_f V$$

where:

$\sigma_y$ is the desired pressure to be attenuated
$\epsilon_f$ is the final foam yield strain, and
V is the foam volume Considering, for example, an under-head configuration with:

$\sigma_y = 300$ psi $\epsilon_f = 0.75$ $V = 2.32 \times 10^6$ in$^3$ with 48 inches of metal foam, the energy absorbed becomes:

$E = 5.22 \times 10^8$ in-lbs $= 59$ megajoules

Absorption of such energy reduces head and upper vessel accident loads in a very significant way.

THIRD EMBODIMENT

Figure 4:
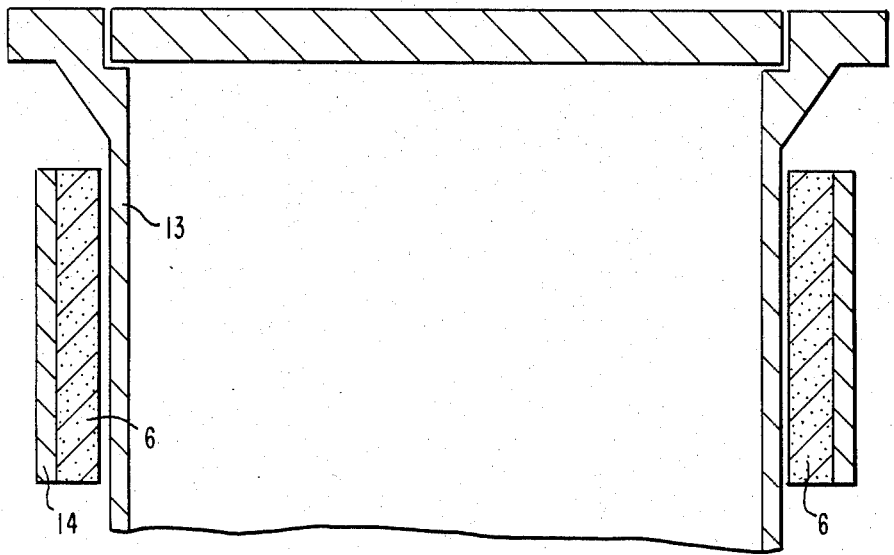
FIG. 4 is a schematic section of a reactor vessel having the pressure surge suppression system of the invention.

Refer to FIG. 4. In this embodiment, crushable metal foam 6 is arranged outside a reactor vessel 13, between said vessel 13 and a plate 14. The functions of the foam are identical to the first two embodiments.

We claim:

1. A pressure surge attenuating system for piping which carries liquid coolant for a nuclear reactor and which attenuating system is operable to attenuate maximum expected pressure surges while maintaining the integrity of said piping to prevent escape of coolant from said piping, said attenuating system comprising:
   a pipe section of said piping having a wall portion with a fluted cross-sectional configuration which can deform by radially expanding without plastic deformation under pressure surges which could be hazardous;
   an enlarged container surrounding said fluted wall pipe section and spaced from said fluted wall pipe section; and
   a crushable metal foam filling the space between said fluted wall pipe section and said surrounding container, said crushable metal foam exhibiting controlled energy absorption upon crushing thereof, and said pressure surge attenuating system operable to attenuate the maximum expected pressure surges which may be encountered while limiting the expansion of said fluted wall section so that it does not exhibit plastic deformation.

2. The pressure surge attenuating system as specified in claim 1, wherein said fluted wall portion, when subjected to pressure surges which could be hazardous, deforms by radial expansion to crush said metal foam which in turn absorbs the energy of deformation to attenuate the original pressure surge.

3. The pressure surge attenuating system as specified in claim 2, wherein said coolant is liquid metal.

4. The pressure surge attenuating system as specified in claim 3, wherein said coolant is liquid sodium.

* * * * *